US008712919B1

(12) United States Patent
Wilf et al.

(10) Patent No.: US 8,712,919 B1
(45) Date of Patent: Apr. 29, 2014

(54) METHODS AND SYSTEMS FOR DETERMINING THE RELIABILITY OF TRANSACTION

(75) Inventors: Saar Wilf, Tel Aviv (IL); Shvat Shaked, Jerusalem (IL)

(73) Assignee: eBay Inc., San Jose, CA (US)

( * ) Notice: Subject to any disclaimer, the term of this patent is extended or adjusted under 35 U.S.C. 154(b) by 2271 days.

(21) Appl. No.: 10/574,546

(22) PCT Filed: Oct. 10, 2004

(86) PCT No.: PCT/IL2004/000928
§ 371 (c)(1),
(2), (4) Date: Apr. 3, 2006

(87) PCT Pub. No.: WO2005/033830
PCT Pub. Date: Apr. 14, 2005

Related U.S. Application Data

(60) Provisional application No. 60/508,246, filed on Oct. 3, 2003.

(51) Int. Cl.
*G06Q 99/00* (2006.01)

(52) U.S. Cl.
USPC .......................................................... 705/75

(58) Field of Classification Search
USPC .............................................. 705/50, 64, 75
See application file for complete search history.

(56) References Cited

U.S. PATENT DOCUMENTS

| 5,757,917 A | 5/1998 | Rose et al. |
| 5,826,241 A | 10/1998 | Stein et al. |
| 5,883,810 A | 3/1999 | Franklin et al. |
| 6,070,141 A * | 5/2000 | Houvener et al. ............... 705/76 |
| 6,157,707 A | 12/2000 | Baulier et al. |
| 6,714,918 B2 * | 3/2004 | Deshpande et al. ............ 705/18 |
| 6,783,065 B2 | 8/2004 | Spitz et al. |
| 2003/0023541 A1 | 1/2003 | Black et al. |

FOREIGN PATENT DOCUMENTS

| WO | WO01/69549 | 9/2001 | ............. G06Q 20/00 |
| WO | WO03/017049 | 2/2003 | ............. G06Q 20/00 |

OTHER PUBLICATIONS

*Data Mining: Practical Machine Learning Tools and Techniques with Java Implementations* by: Ian H. Witten, Eibe Frank, Morgan Kaufmann (Oct. 1999).
Statement in accordance with the Notification from the European Patent Office dated Oct. 1, 2007 concerning business methods, XP002456252, (Oct. 1, 2007), 592-593.
Ghosh, et al., "Credit Card Fraud Detection witha Neural-630 Network", *IEEE.*, (1994), 621-630.
Pias, et al., "Securingthe Internet Metering and Billing", *IIEE*, (2002), 1603-1607.

(Continued)

*Primary Examiner* — James D Nigh
(74) *Attorney, Agent, or Firm* — Schwegman, Lundberg & Woessner, P.A.

(57) ABSTRACT

Systems and methods for determining a reliability of a transaction involving an account identifier identifying a chargeable account are disclosed. In accordance with an exemplary embodiment of the present invention, the system receives an account identifier and optionally at least one candidate personal detail. A reliability indicator provider provides at least one reliability indicator indicating an estimated likelihood that at least one stored personal detail associated with the chargeable account was submitted fraudulently. According to particular embodiments, fraudulently submitted stored personal details are indicative that a proposed transaction involving a buyer and a seller is fraudulent.

20 Claims, 4 Drawing Sheets

(56) References Cited

OTHER PUBLICATIONS

Richardson, Robert, "Neural Networks Compared to Statistical Techniques", *IIEE*, (1997), 89-95.
Waggoner., Darren, "New Strides in Fraud-Free Online Shopping Collections & CreditRisk,", (2002), 20, 22 and24.
"European Application Serial No. 04791824.8, Office Action Mailed Jan. 18, 2010", 5 pgs.
European Application Serial No. 04791824.8, Office Action mailed May 15, 2006, 2 pgs.
European Application Serial No. 04791824.8, Office Action mailed Oct. 6, 2006, 1 pg.
European Application Serial No. 04791824.8, Office Action Response Filed Jun. 4, 2010, 11 pgs.
European Application Serial No. 04791824.8, Decison to Refuse mailed Aug. 12, 2011, 12 pgs.
European Application Serial No. 04791824.8, Summons to Attend Oral Proceedind mailed Mar. 22, 2011, 7 Pgs.
International Application Serial Appl. No. PCT/IL2004/000928, International Preliminary Report on Patentability mailed Apr. 10, 2006, 1 pg.
International Application Serial No. PCT/IL2004/000928, International Search Report mailed Mar. 14, 2006, 3 pgs.
International Application Serial No. PCT/IL2004/000928, Written Opinion mailed Mar. 14, 2006, 5 pgs.
Israel Application No. 174626, Response filed Jun. 1, 2011, in English, 18 pgs.
Israel Application Serial No. 174626, Office Action mailed Jan. 13, 2013, 2 pgs.
Israel Application Serial No. 174626, Office Action mailed Jul. 29, 2013, 1 pg.
Israel Application Serial No. 174626, Office Action Mailed Aug. 2, 2011, 1 pg.
Israel Application Serial No. 174626, Office Action Response filed Jul. 26, 2010, with English translation, 13 pgs.
Israel Application Serial No. 174626, Office Action mailed Jan. 18, 2011, 1 pg.
Israeli Application Serial No. 174626, Office Action mailed May 7, 2012, 1 pg.
Israeli Application Serial No. 174626, Response filed Apr. 3, 2013, with English translation of claims, 6 pgs.
Israeli Application Serial No. 174626, Response filed Oct. 9, 2011 to Office Action mailed Aug. 2, 2011, in English, 23 pgs.
Israeli Application Serial No. 174626, Response filed Nov. 20, 2012, with English translation, 14 pgs.
Israeli Application Serial No. 174626, Office Action mailed Sep. 12, 2012, 3 pg.
Isreali Application Serial No. 174626, Office Action mailed 0-12-11, 1 pg.

* cited by examiner

METHODS AND SYSTEMS FOR DETERMINING THE RELIABILITY OF TRANSACTION

RELATED APPLICATIONS

This application is a U.S. National Stage Filing under 35 U.S.C. 371 from International Patent Application Serial No. PCT/IL2004/000928, filed Oct. 10, 2004, and published on Apr. 14, 2004 as WO 2005/033830 A2, which claims the priority benefit of U.S. Provisional Application Ser. No. 60/508,246, filed Oct. 3, 2003, which applications and publication are incorporated herein by reference in their entirety.

BACKGROUND OF THE INVENTION

Many sellers offer products or services without requiring the physical presence of the buyer. Buyers usually contact such sellers by phone, fax, Short Message Service (SMS), email, or through the seller's website.

In order to pay the seller, the remote buyer will often provide an identifier of a chargeable account, such as a credit card number, debit card number, checking account number, bank account identifier or phone number. The seller then uses this identifier to charge the account.

Fraudsters who gain access to an account identifier could contact a seller, provide the identifier to the seller, and cause the true owner of the account to be charged.

In order to prevent such fraudulent transactions, sellers deploy various methods to verify that an account belongs to the buyer. One such method is requiring the buyer to provide personal details of the account owner, which are then compared with information associated with the account at a trustable third party, such as the organization administering the account (the 'account issuer') or a transaction processing service, which receives account information from multiple sellers.

For example, sellers often require buyers to provide a mailing address of a credit card account owner (usually the address where the owner receives his credit card bills, known as the billing address), and compare this mailing address to addresses stored on the databases of the bank that issued the card. The seller may of course do the same with any other personal details of the account owner, such as a name, a phone number, a government-issued identifier (e.g. driver's license number), an email address etc.

Sellers use a variety of methods to contact the issuer when performing such a comparison, such as speaking with a representative of the account issuer over the phone, exchanging faxes with the issuer, or using the issuer's IVR (Interactive Voice Response) system.

Additionally, banks in the United States, Canada and the United Kingdom offer an automatic service for verifying billing addresses called AVS (Address Verification System). To use AVS, the seller sends to the bank, over the credit card data network, an AVS request containing the numeric portion of the billing address (house number+zip code) and the card number, and receives a response that describes which of the elements in the AVS request match the bank's records. Furthermore, some banks allow cardholders to add an additional address to the account, so the cardholders could provide sellers with this address without causing AVS to fail. United States published patent application 2003/0023541, the entirety of which is herein incorporated by reference, discloses methods and systems for verifying billing addresses and additional addresses.

By requiring buyers to present personal details at the time of transaction, and by comparing these presented personal details with previously obtained and stored personal details, sellers expect to decrease the incidence of fraud, as fraudsters are less likely to know specific personal details than the legitimate account owner. In practice, fraudsters have found simple ways to gain access to these personal details and thus this method is now considered ineffective.

Sellers may complicate fraud attempts by performing some action based on the personal details, such as shipping goods only to the verified billing address, calling the verified phone number to check that the account owner is aware of the transaction, or sending an email to the verified email account. The first two methods (shipping to the billing address and calling the account owner) are currently used by many sellers, whereas the last method (sending an email) is not, since banks do not usually have account owners' email addresses and do not usually provide means for verifying them. U.S. Pat. Nos. 5,757,917 and 5,826,241 the entirety of which is herein incorporated by reference, and PCT Applications WO03/017049 and WO01/69549 the entirety of which is herein incorporated by reference describe methods for verifying payments by email, in which buyers need to register their account identifiers and email addresses in advance.

Nevertheless, fraudsters could still circumvent such measures by contacting the issuer, impersonating the legitimate account owner and requesting that the issuer update stored personal details. For example, credit card issuers in the United States often verify callers by requiring the Social Security Number (SSN) of the cardholder. A fraudster who gains access to the SSN can thus change the billing address (or add an alternate address) to an address where he can receive merchandise, or change the phone number to a number where he can receive calls. In another example, a fraudster may use stolen information of another person to open a new credit card account, and provide any additional personal details he wants.

There is an ongoing need for techniques for assessing the reliability of transactions submitted by buyers. Furthermore, there is a recognized need for methods and systems for verifying and assessing the reliability of personal details presented in transactions of remote buyers, particularly in the context of e-commerce.

BRIEF SUMMARY OF THE INVENTION

In accordance with some aspects of the present invention, a method is provided for determining the reliability of a transaction involving an account identifier identifying a chargeable account. Specifically, methods disclosed in accordance with some embodiments include receiving the account identifier; and providing at least one reliability indicator indicating the estimated likelihood that at least one stored personal detail associated with the chargeable account was submitted fraudulently.

In exemplary embodiments, the methods of the present invention provide tools for helping sellers and other interested parties to distinguish between a buyer who is the true and legitimate owner of a chargeable account, and a buyer who is attempting to impersonate the true account owner and to defraud the seller or other interested parties.

Not wishing to be bound by theory, it is now disclosed that fraudsters are known to contact account issuers, impersonate the legitimate account owner, request that the issuer update stored personal details, and execute one or more fraudulent transactions involving sellers using the updated personal details. Therefore, the existence of fraudulent personal details submitted to an account issuer is indicative that subsequent transactions attempted with the chargeable account are more likely to be fraudulent transactions. Thus, knowledge of the circumstances under which stored personal details were submitted allows a seller or other interested party to better discern between a legitimate buyer and a fraudster.

In particular embodiments, the reliability indicators of embodiments of the present invention may be used to augment existing techniques for verifying personal details. Specific examples of these existing techniques are based upon comparing at least one candidate personal detail with at least one stored personal detail.

According to various embodiments, at least one reliability indicator is based on a time at least one stored personal detail was received, an identification procedure performed upon receipt of at least one stored personal detail, and/or the degree of personal exposure of the person who submitted at least one stored personal detail.

In specific embodiments, a more recent submission time increases the estimated likelihood that at least one stored personal detail was submitted fraudulently, and concomitantly increases the estimated likelihood that one or more proposed transactions involving a seller are fraudulent.

In specific embodiments, a lower degree of personal exposure increases the estimated likelihood that at least one stored personal details was submitted fraudulently, and concomitantly increases the estimated likelihood that one or more proposed transactions involving a seller are fraudulent.

In specific embodiments, submission of at least one stored personal detail using the Internet increases the estimated likelihood that the at least one stored personal detail was submitted fraudulently.

In specific embodiments, submission of at least one stored personal detail in person decreases the estimated likelihood that the at least one stored personal detail was submitted fraudulently.

In specific embodiments, the presentation of a verifying item upon submission of at least one stored personal detail decreases the estimated likelihood that at least one stored personal detail was submitted fraudulently, and concomitantly decreases the estimated likelihood that one or more proposed transactions involving a seller are fraudulent. Exemplary verifying items include but are not limited to government issued identification, a hand signature and biometric information.

In particular embodiments, fraud prevention measures based upon the provided at least one reliability indicator are carried out.

Exemplary fraud prevention measures include but are not limited to: making a phone call to a verified phone number, sending an email to a verified email address, and/or physically sending an item to a verified street address.

In particular embodiments, the methods provided further comprise authorizing or denying a transaction based upon the determined reliability of candidate personal details.

Exemplary personal details include but are not limited to the account owner's name, his street address, his phone number, his email address, his government-issued identifier, a billing address, an additional address, a mother's maiden name, and/or a social security number.

According to some other aspects, the present invention provides a verification system for determining the reliability of a transaction involving an account identifier identifying a chargeable account. This verifickion system includes a data receiving unit configured to receive data selected from the group consisting of the account identifier and at least one candidate personal detail, a reliability indicator provider for providing at least one reliability indicator indicating the estimated likelihood that at least one stored personal detail associated with the chargeable account was submitted fraudulently; and optionally a data output unit configured to output data.

These and further embodiments will be apparent from the detailed description and examples that follow.

DETAILED DESCRIPTION OF THE INVENTION

Figure 1:
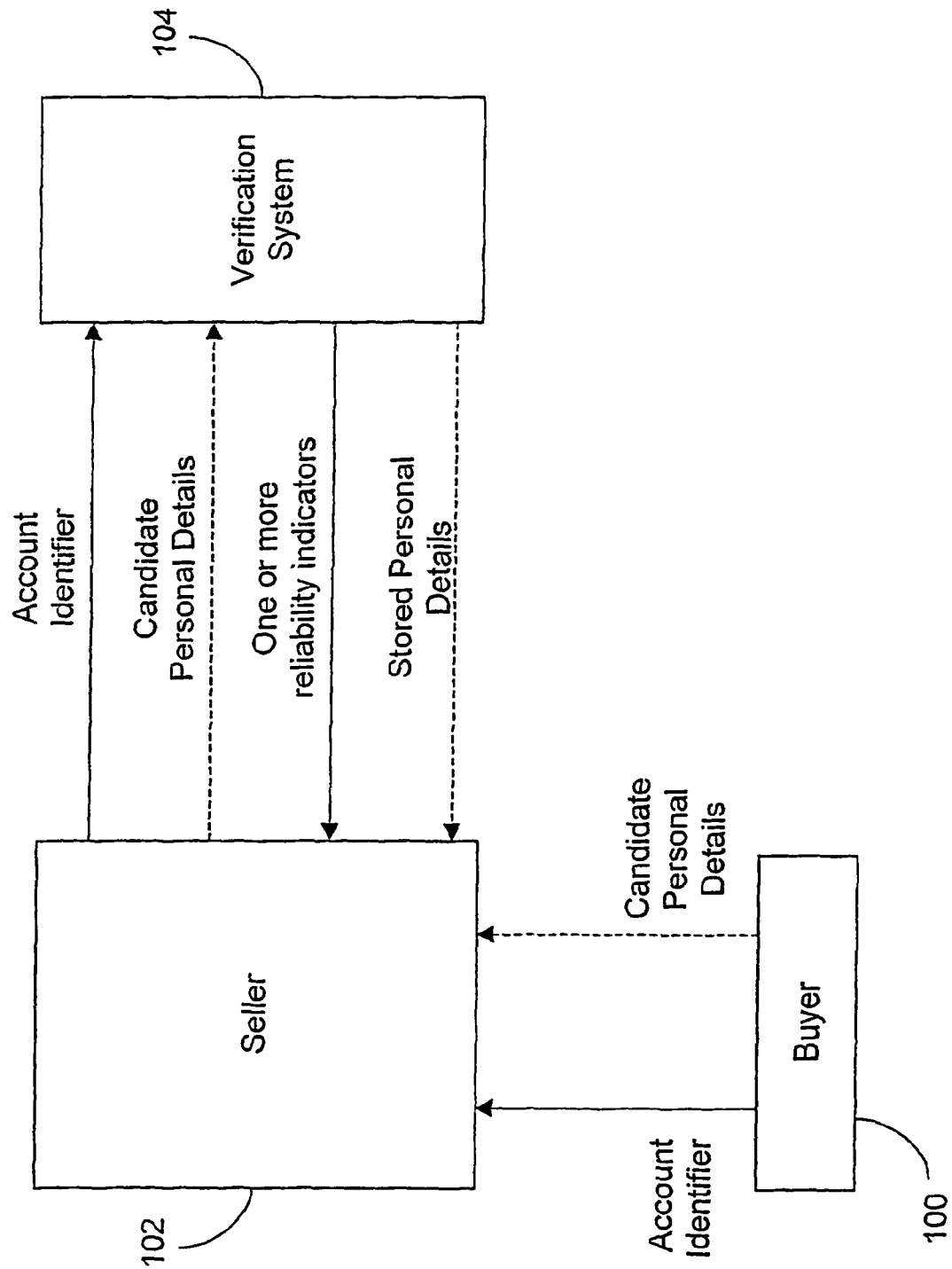
FIG. 1 provides a block diagram of specific embodiments of the present invention involving a buyer, a seller and verification system.

Prior to setting forth the invention, it may be helpful to an understanding thereof to first set forth definitions of certain terms that are used hereinafter.

As used herein the term "personal details" are any extra information associated with a chargeable account. Examples of "personal details" include but are not limited to the account owner's name, his street address, a billing address, his phone number, his email address, his government-issued identifier, a mother's maiden name, a social security number, etc.

It is understood that this chargeable account may but does not necessarily belong to a single person, and may be owned by a group of persons, a business, or any other entity.

As used herein, the term "buyer" refers to any person or entity, which wishes to execute a transaction with a "seller" by using a chargeable account. In different contexts, the term "buyer" may refer to the true owner of the chargeable account, to a person authorized by the true owner, or to a fraudster impersonating the true owner.

As used herein, the term "stored personal details" relates to personal details submitted to a party other than the seller. The stored personal details may be submitted by any entity, including the true owner of the account or a fraudster. In particular embodiments, these details are submitted to an organization administering the chargeable amount, or to a party storing data related to the chargeable account. In particular embodiments, these stored personal details are stored in computer memory, computer readable media or on human readable media such as ink on paper.

As used herein, the term "candidate personal details" or "presented personal details" both refer to any personal details submitted by a buyer or other interested entity in relation to the account identifier.

As used herein, "reliability indicators" are information indicating an estimated likelihood that at least one stored personal details associated with the chargeable account were submitted fraudulently.

One exemplary reliability indicator is the identification procedure performed when the stored personal details were received. Secure identification procedures increase their reliability, in comparison to less secure procedures. An identification procedure is considered secure if it is more difficult for a fraudster impersonating another person to pass it successfully compared to a person using his real identity. For example, if the information was received in a fax along with a photocopy of the account owner's government-issued ID, the information should be considered more reliable than if the information was faxed with no identifying document.

Another exemplary reliability indicator is the level of exposure taken by the person who supplied the information. In this context, exposure is defined as the difficulty to apprehend a person if he is determined to be a criminal. Fraudsters usually try to avoid apprehension, and therefore try to minimize exposure as much as possible. Therefore, a transaction in which a person exposes himself is less likely to be fraudulent. For example, if the information was received in the physical presence of the person it can be considered more reliable than if it was received in an anonymous Internet communication.

Another indicator is the time at which the information was received. Information that was received a long time before a buyer contacted a seller to request a transaction may be considered more reliable than information received more recently. Time affects reliability since fraudsters usually use a specific identity for a short time (e.g. they obtain a stolen credit card and quickly perform several charges until it is blocked). Therefore, information submitted a long time in the past is less likely to be part of a scam currently conducted by buyer, than information that was received recently.

Similarly, any other evidence that shows the information was provided without fraudulent intentions may be used.

The present inventors have developed methods for verifying and assessing the reliability of a transaction involving a chargeable account, by using at least one reliability indicator.

FIG. 1 describes the environment related to certain embodiments of the invention. Buyer 100 wishes to obtain a product or service from Seller 102. Buyer 100 provides Seller 102 with chargeable account identifier and candidate personal details. If Buyer 100 is the account owner or one authorized by the account owner, the transaction is legitimate. If Buyer 100 is not the account owner and is not authorized by him, the transaction is fraudulent.

Examples of chargeable account identifiers include but are not limited to a credit card number, a debit card number, a checking account number, a bank account identifier, a phone number or any identifier that would allow Seller 102 to charge an account. In certain embodiments, Seller 102 obtains an account identifier, candidate personal details or parts thereof from a source other than Buyer 100. In other embodiments, Seller 102 obtains the account identifier without candidate personal details. In one exemplary embodiment, Buyer 100 contacts Seller 102 by phone or SMS and Seller 102 subsequently obtains Buyer 100's phone number (the account identifier) using the Caller ID service or from information received with the SMS message. In another exemplary embodiment, Buyer 100 provides his name, and Seller 102 retrieves the street address or phone number of Buyer 100 from a white pages directory.

Seller 102 then forwards the account identifier and optionally the candidate personal details to Verification System 104. Verification System 104 returns at least one reliability indicator, and optionally stored personal details.

Figure 2:
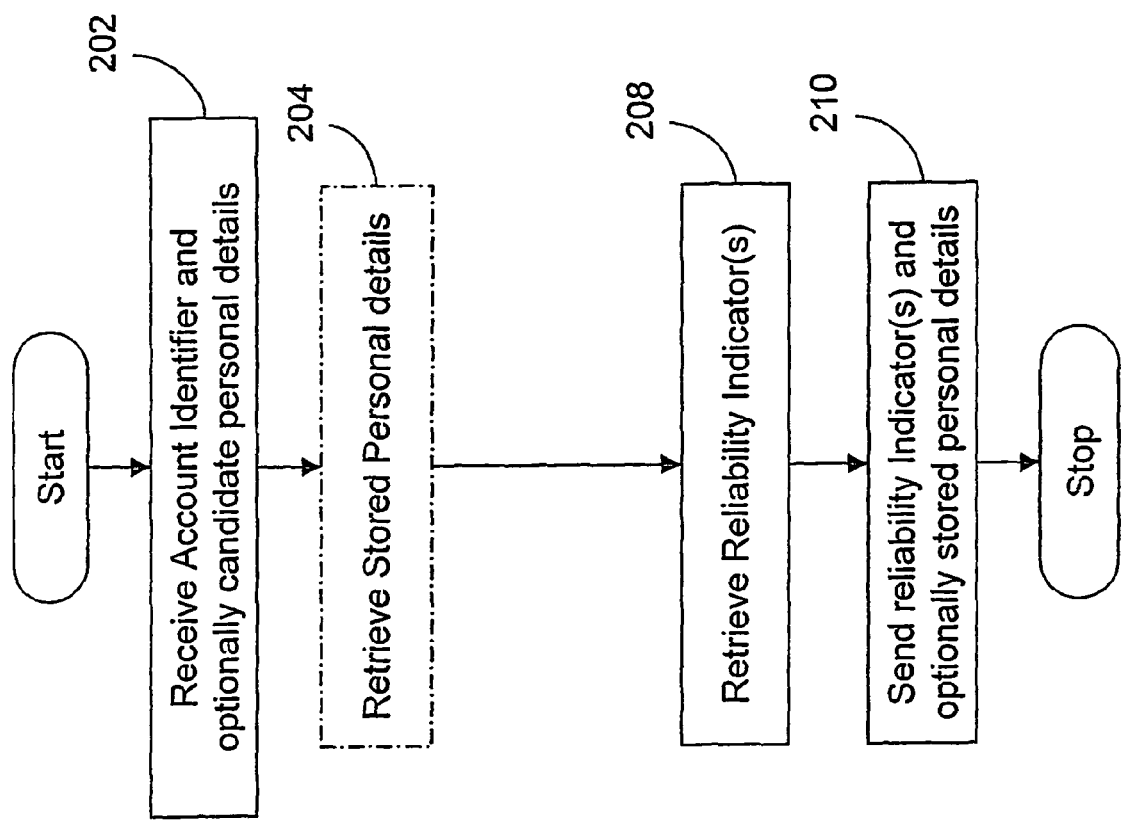
FIG. 2 provides a flow chart of specific embodiments of the present invention.

FIG. 2 describes exemplary steps taken by Verification System 104.

First, Verification System 104 receives an account identifier and optionally candidate personal details (step 202). The Verification System 104 then optionally retrieves stored personal details (step 204). In certain embodiments, these stored personal details are retrieved from an account database (step 204). For example, this database may be the customer database of a credit card issuer (or a replica of it), containing the cards' details, cardholders' personal information and history of interactions between the issuer and the cardholders. In another example, this database is the transaction history of a credit card processing service, containing for each transaction the card's details and the cardholder personal information submitted with it.

In embodiments described in FIG. 2, the Verification System 104 next retrieves reliability indicator(s) (step 208), and then sends the reliability indicator(s) and optionally the stored personal details (step 210).

Figure 3:
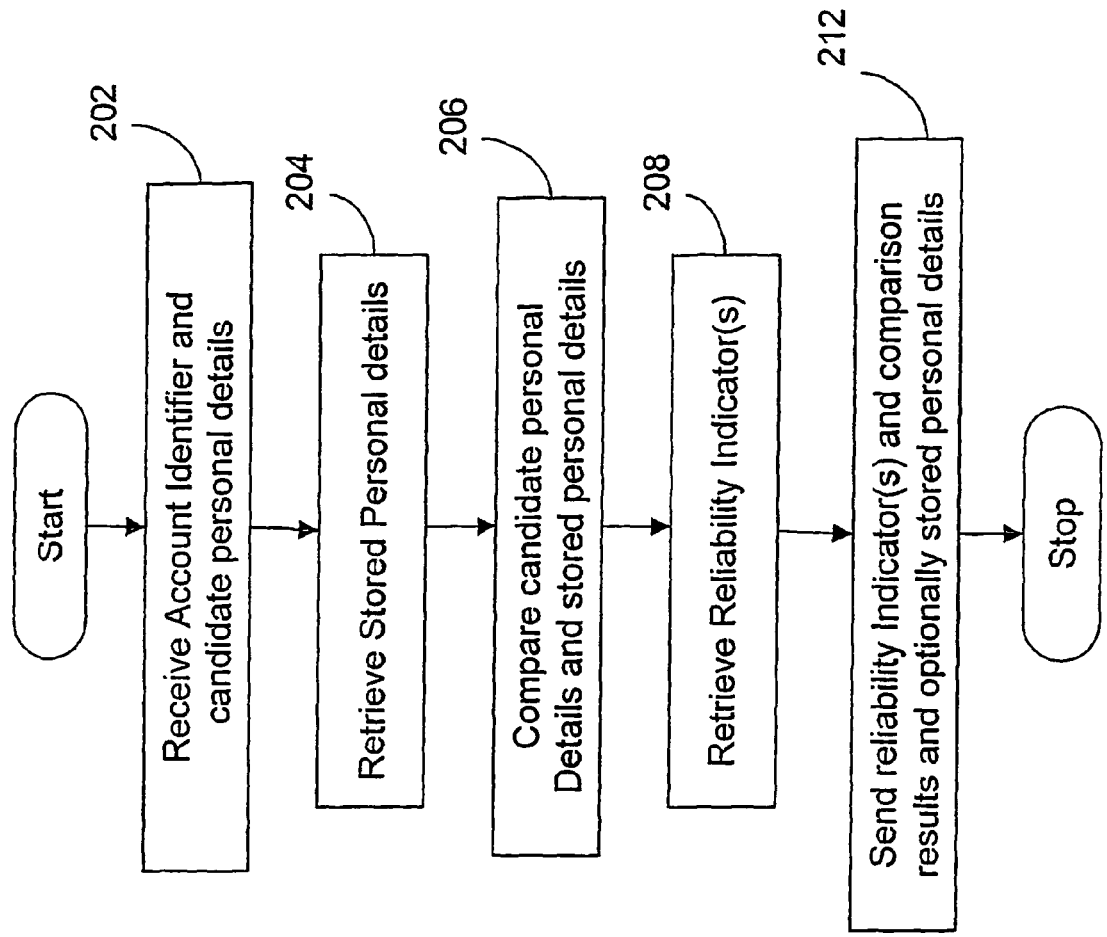
FIG. 3 provides a flow chart of specific embodiments of the present invention wherein at least one candidate personal detail is compared to at least one stored personal detail.

FIG. 3 provides illustration of embodiments wherein candidate personal details are received and wherein the received candidate personal details are compared to stored personal details (step 206).

In specific embodiments, this comparison between candidate and stored personal details is carried out by seeking a literal match. For example, an email address provided in the candidate personal details may be found to be identical to an email address in the stored personal details. In other embodiments, comparison is done by seeking a partial literal match. For example, candidate personal details may contain a US 5-digit zip code that matches the beginning of a US 9-digit zip code found in the stored personal details. Comparison may also be done by looking for a match with spelling difference (e.g. 'Forty-Second St.' and '42nd street') or a nickname match (e.g. 'Tom' and 'Thomas'). The match between the candidate and stored personal details can also be based on a directory listing. In one exemplary embodiment, the candidate personal details include a name, the stored personal details include a phone number, and a phone directory listing shows the name and phone number match. The match between the candidate and stored personal details can also be based on a combination of any of the match types above.

The comparison results can be expressed in various ways. One option is to provide a match/no-match flag. If several items are available in the details, a flag may be provided for each item (e.g. "name: no match, street address: match, zip code: match"). Another option is to provide a match score, wherein high scores indicate a strong match and low scores indicate a weak match (e.g. "John Smith" compared to "John Smith" will get a higher score than "J D Smith" compared to "John Smith", which in turn will get a higher score than "David Jones" compared to "John Smith").

In embodiments described in FIG. 3, at least one reliability indicator is subsequently retrieved (step 208). Although shown this way in FIG. 3, it is not a requirement of the present invention that the candidate personal identifiers be compared with the stored personal identifiers (step 206) before the at least one reliability indicator are retrieved (step 208). Thus, in other embodiments, the at least one reliability indicator are retrieved (step 208) before the actual comparison step 206.

Reliability indicators may also be derived by data mining a training set including potential reliability indicators with potential predictive power using techniques known from the fields of statistics or machine learning. In particular embodiments, this training set includes data about the potential reliability indicators and data about whether proposed transactions included elements of fraud or not. Exemplary techniques include but are not limited to C45 trees, Hidden Markov Models, Neural Networks, or meta-techniques such as boosting or bagging. In specific embodiments, this statistical model is created in accordance with previously collected "training" data. Appropriate statistical techniques are well known in the art, and are described in a large number of well known sources including, for example, *Data Mining: Practical Machine Learning Tools and Techniques with Java Implementations* by Ian H. Witten, Eibe Frank; Morgan Kaufmann, October 1999), the entirety of which is herein incorporated by reference.

Verification System 104 may create a new reliability indicator based on analysis of existing reliability indicators. In specific embodiments, this new reliability indicator is created by using a statistical model created in accordance with known statistical techniques, or known techniques from the field of data modeling. The skilled practitioner is directed to *Data Mining: Practical Machine Learning Tools and Techniques with Java Implementations* by Ian H. Witten, Eibe Frank; Morgan Kaufmann, October 1999).

In one exemplary embodiment, the exact time at which information was received is replaced with a threshold-based indicator such as 'old' for information received over 1 year ago, 'recent' for information received between 1 month and 1 year ago, and 'very recent' for information received in the last month. In another embodiment, a reliability score between 0 and 100 is generated based on an analytical model that combines several reliability indicators (e.g. identification procedure, exposure level and time). In another embodiment, a flag is generated based on all available reliability indicators, which can be equal to either 'reliable' or 'unreliable'.

In particular embodiments, the at least one reliability indicator is provided implicitly to Seller 102. In one exemplary embodiment, Verification System 104 is configured to inform Seller 102 that candidate personal details don't match stored personal details if Verification System 104 has determined that stored personal details are not reliable (even if candidate personal details do in fact match stored personal details). In this exemplary embodiment, a response from Verification System 104 informing Seller 102 that candidate personal details match stored personal details, contains an implicit indicator that the personal details are reliable. This exemplary embodiment allows introduction of implicit reliability indicators into computer systems that have not been specifically adapted to handle explicit reliability indicators.

Finally, Verification System 104 sends to Seller 102 the results of the comparison process and the one or more reliability indicators (step 212). If different matching elements in the stored personal details have different reliability, separate reliability indicators may be reported for each. In one example, both a name and a billing address in the candidate personal details are found to match the stored reliability details, but the name is found to be provided 2 years ago in the presence of the person who opened the account, while the address was changed over the phone 3 days ago. In this case, the response may include a different reliability indicator for each of the name and address.

After receiving the response, Seller 102 will in specific cases perform some action based on the response. For example, if the comparison results indicate that candidate personal details doesn't match the stored personal details, or if the reliability indicator indicates low reliability, Seller 102 may reject Buyer 100's transaction. In another example, if a phone number is reported matching and reliable, Seller 102 may call that number and verify that Buyer 100 answers the phone (e.g. check that the person who answers is aware of the transaction). In another example, if a mailing address is reported matching and reliable, Seller 102 may ship a product requested by Buyer 100 to this address. In another example, if an email address is reported matching and reliable, Seller 102 may send an email to that address and verify that Buyer 100 can access the email (e.g. by requiring Buyer 100 to provide Seller 102 with a secret code sent in the email).

In another preferred embodiment of the present invention, Seller 102 provides to Verification System 104 the account identifier without candidate personal details, and Verification System 104 provides in response stored personal details and the one or more reliability indicators. Seller 102 can then use the information contained in the stored personal details the same way he used the verified elements in candidate personal details in the previous embodiment. In this embodiment there is also no need for Buyer 100 to provide candidate personal details to the Seller 102.

Figure 4:
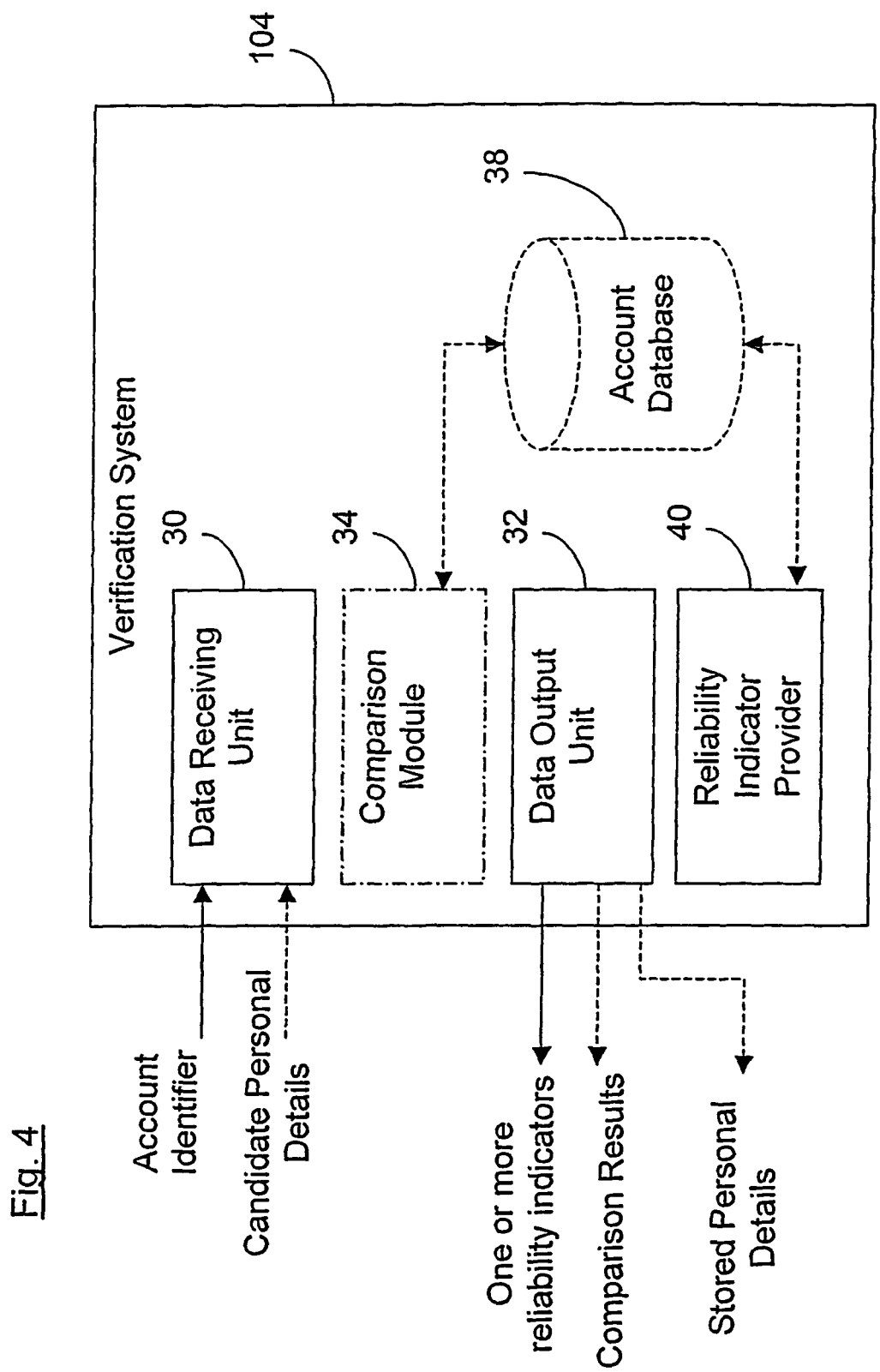
FIG. 4 provides a diagram of an exemplary system of the present invention.

FIG. 4 describes the components of the system in accordance with a preferred embodiment of the present invention.

A Data Receiving Unit 30 receives an account identifier and optionally candidate personal details from an entity outside of the Verification System 104. In particular embodiments, this entity is the Seller 102. The Data Output Unit 32 outputs the at least one reliability indicator, and optionally comparison results and optionally one or more stored personal details. It is noted that data may enter or leave the Verification System 104 through any applicable medium, such as a private data network, the Internet, IVR, modem etc.

In the embodiment shown in FIG. 4, the Reliability Indicator Provider 40 retrieves at least one reliability indicator and optionally stored personal details, by connecting to Account Database 38. In one particular embodiment, the account database is a relational database such as those available from Microsoft (Redmond, Wash.) or Oracle (Redwood Shores, Calif.). In one particular embodiment, the account identifier, the stored personal details and the at least one reliability indicator are associated in the Account Database. Account Database 38 may be physically part of Verification System 104 or an external component accessible over any applicable medium.

Optional Comparison Module 34 compares candidate and stored personal details to determine whether they match, as described above.

The Reliability Indicator Provider 104 is optionally further configured to create at least one reliability indicator based on analysis of retrieved reliability indicators, as described above.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

What is claimed is:

1. A method of determining a reliability of a transaction involving an account identifier identifying a chargeable account, the method comprising:
   a) receiving the account identifier at a data receiving unit of a verification system;
   b) determining, using one or more processors, a reliability indicator of at least one stored personal detail associated with the chargeable account, the at least one stored personal detail usable to verify at least one candidate personal detail, the reliability indicator determined based on at least one of a time the at least one stored personal detail was received and associated with the account identifier, a record of an identification procedure performed upon receipt of the at least one stored personal detail, or a record of a degree of personal exposure of an entity submitting the at least one stored personal detail, the at least one stored personal detail retrieved from an account database; and
   c) from the verification system, providing the reliability indicator to a user.

2. The method of claim 1 further comprising:
   d) providing at least one said stored personal detail.

3. The method of claim 1 further comprising:
   d) comparing the at least one candidate personal detail to at least one said stored personal detail.

4. The method of claim 1, wherein if the time the at least one stored personal detail was received occurred less than a predetermined period before the transaction, the reliability of the at least one stored personal detail is decreased.

5. The method of claim 1, wherein if the degree of personal exposure of an entity is a physical presence of a person, the reliability of the at least one stored personal detail is increased.

6. The method of claim 5 wherein if the degree of personal exposure of an entity is a submission of at least one said stored personal detail using the Internet, the reliability of the at least one stored personal data is decreased.

7. The method of claim 1 wherein at least one said reliability indicator is based on said identification procedure and a presentation of a verifying item upon submission of at least one said stored personal detail.

8. The method of claim 7 wherein said verifying item is selected from the group consisting of government issued identification, a hand signature and biometric information.

9. The method of claim 1 further comprising
   d) carrying out fraud prevention measures based upon provided said at least one determined reliability indicator.

10. The method of claim 9 wherein said fraud preventing measures are selected from the group consisting of making a phone call to a verified phone number, sending an email to a verified email address, and physically sending an item to a verified street address.

11. The method of claim 1 further comprising:
   d) authorizing or denying a transaction based upon provided said at least one determined reliability indicator.

12. The method of claim 1 wherein said at least one stored personal detail is selected from the group consisting of account owner's name, a street address, a billing address, an additional address, a phone number, an email address, a government-issued identifier, a mother's maiden name, a social security number.

13. The method of claim 1 further comprising:
   d) combining a plurality of said reliability indicators to obtain at least one combined reliability indicator.

14. A verification system for determining a reliability of a transaction involving an account identifier identifying a chargeable account, the system comprising:
   a) a data receiving unit configured to receive an account identifier or at least one candidate personal detail;
   b) a computer-readable storage medium having instructions stored thereon, the instructions executable by a processor for implementing a reliability indicator provider to determine at least one reliability indicator of at least one stored personal detail associated with the chargeable account, the at least one stored personal detail usable to verify at least one candidate personal detail, the reliability indicator determined based on at least one of a time the at least one stored personal detail was received and associated with the account identifier, a record of an identification procedure performed upon receipt of the at least one stored personal detail, or a record of a degree of personal exposure of an entity submitting the at least one stored personal detail.

15. The system of claim 14 further comprising
   c) a data output unit configured to output data selected from the group consisting of said at least one reliability indicator and at least one said stored personal details.

16. The system of claim 14 further comprising:
   c) a chargeable account database for storing data selected from the group consisting of at least one said stored personal detail, at least one candidate personal detail, at least one said account identifier, and at least one said reliability indicator.

17. The system of claim 14 wherein said reliability indicator provider includes a combining module for combining a plurality of said reliability indicators to produce a combined reliability indicator.

18. The system of claim 14 further comprising:
   c) a comparison module, for comparing at least one said candidate personal detail with at least one said stored personal detail.

19. The system of claim 15 further comprising:
   d) a comparison module, for comparing at least one said candidate personal detail with at least one said stored personal detail,
   wherein said data output unit is further configured to send results of said comparison.

20. The method of claim 9 further comprising:
   d) authorizing or denying a transaction based upon provided said at least one determined reliability indicator.

* * * * *

UNITED STATES PATENT AND TRADEMARK OFFICE
CERTIFICATE OF CORRECTION

| | | |
|---|---|---|
| PATENT NO. | : 8,712,919 B1 | |
| APPLICATION NO. | : 10/574546 | |
| DATED | : April 29, 2014 | |
| INVENTOR(S) | : Wilf et al. | |

It is certified that error appears in the above-identified patent and that said Letters Patent is hereby corrected as shown below:

In the Claims

Column 9, line 20, Claim 9, delete "comprising" and insert --comprising:--, therefor Column 9, line 35, Claim 12, after "name,", insert --and--, therefor Column 10, line 15, Claim 15, delete "comprising" and insert --comprising:--, therefor Signed and Sealed this
Eighteenth Day of November, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,712,919 B1  
APPLICATION NO. : 10/574546  
DATED : April 29, 2014  
INVENTOR(S) : Wilf et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1885 days.

Signed and Sealed this
Twenty-ninth Day of September, 2015

Michelle K. Lee
*Director of the United States Patent and Trademark Office*